Figure 1:
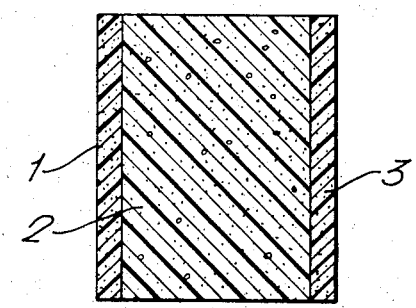

United States Patent [19]
Stark

[11] 3,861,994
[45] Jan. 21, 1975

[54] PACKING LAMINATE
[75] Inventor: Sven O. S. Stark, Rydsgard, Sweden
[73] Assignee: Tetra Pak Developpement SA, Lausanne, Switzerland
[22] Filed: Mar. 12, 1973
[21] Appl. No.: 340,456

[30] Foreign Application Priority Data
Apr. 28, 1972 Switzerland.......................... 6358/72

[52] U.S. Cl.................. 161/161, 161/165, 161/256, 206/46 FC, 206/46 R
[51] Int. Cl............................ B32b 3/26, B32b 5/18
[58] Field of Search ........... 161/161, 160, 165, 256; 206/46 R, 46 FC

[56] References Cited
UNITED STATES PATENTS
| 3,463,687 | 8/1969 | Folsom et al. | 156/79 |
| 3,619,344 | 11/1971 | Wolinski et al. | 161/161 |
| 3,677,874 | 7/1972 | Sterrett et al. | 161/161 |

Primary Examiner—William J. Van Balen
Attorney, Agent, or Firm—Pierce, Scheffler & Parker

[57] ABSTRACT

A laminated packaging material for making carton-like packages which consists of an intermediate layer of polystyrene foam plastic having a fine cellular structure and outer facing layers of a homogeneous plastic such as crystalline polystyrene or polystyrene with a butadiene additive.

2 Claims, 2 Drawing Figures

PACKING LAMINATE

The present invention concerns a packing laminate of the type which comprises a layer of polystyrene foam plastic with fine cellular structure and homogeneous plastic layers on both sides of this layer.

In the packaging technique packing material is often used which is made up of laminate combinations, e.g., paper and plastic or cardboard and plastic, where the paper or cardboard layer is intended to give the packing material the required mechanical rigidity, whilst the plastic layer is intended partly to make the packing material tight in relation to the intended filling material, partly to form a protective film for the paper layer, which otherwise easily absorbs moisture or liquid the paper layer comes into contact with, as a result of which the mechanical properties aimed at are lost. Even where it is possible in the above-mentioned manner to protect a paper layer in a paper laminate with coatings of plastic or wax so as to prevent the absortion of liquid, a considerable problem still remains in that the cutting edges of the packing laminate have an unprotected paper surface, in which liquid absorption can easily occur with resulting, at least partial, reduction in strength of the finished package. Even though in most cases the above-mentioned problem of the packing laminate containing paper layers can be solved by means of cover strips of e.g., plastic material bridging over the cutting edges, it has long been a desirable object to manufacture a packing laminate which does not absorb liquid, but which still has the required rigidity properties. One method to solve this problem consists of using instead of the paper layer as a stiffening material a relatively thick foam plastic material, e.g., polystyrene. The foam plastic layer in itself has not got any strength properties worth mentioning, but by combining the two homogeneous plastic layers and fixing them at a certain distance from one another a beam effect of the packing laminate is obtained, which gives rise to very good rigidity properties, even if the homogeneous plastic layers in themselves do not possess such properties. Such a packing laminate does not absorb moisture and liquid since the foamed plastic material consists of a large number of closed cells, but one disadvantage of such a packing laminate lies in the fact that it is relatively brittle and that the homogeneous plastic layers often crack when they are exposed to the effect if impact, for example in connection with the manufacture of the package when the packing material is strongly folded or when the finished package during transport and handling is exposed to shocks.

Naturally it is particularly important that the homogeneous plastic layer which is to form the inside of the finished package should not present any cracks, and this can be achieved by using a packing laminate in accordance with the invention, that is to say a packing laminate which is characterized in that the foamed plastic layer has a thickness of 0.5–2 mm and a density of 0.05–0.15 g/cm³, that the homogeneous plastic layer on the side of the packing laminate which shall form the inside in the finished package consists of a plastic material with a modulus of elasticity of 14,000–20,000 and with a pick up weight of 50–100 g/m² and that the homogeneous plastic layer on the side which is intended to form the outside of the finished package consists of a plastic material with a modulus of elasticity of 30,000–50,000 and with a pick up weight of 30–80 g/m².

A packing laminate of the above-mentioned type has an inner layer which does not break when it is subjected to stresses, since butadiene mixed into the polystyrene material has the effect of giving the inner layer a high rupture elongation, that is to say the material has the property when subjected to mechanical stresses of stretching to a relatively appreciable extent before it breaks.

Figure 2:
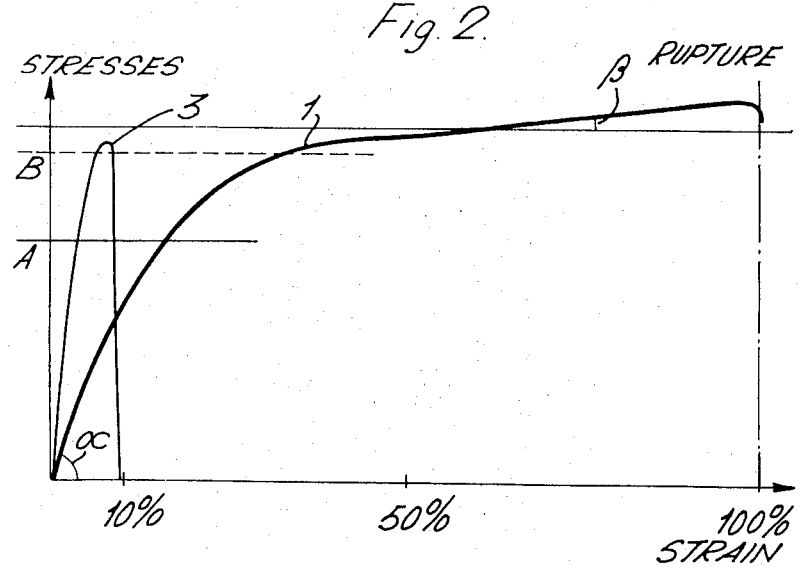

A packing laminate in accordance with the invention will be described in the following with reference to the enclosed drawing, in which FIG. 1 shows an enlarged cross-section through a packing laminate layer, and FIG. 2 shows a stress-strain diagram for the layer of the packing laminate which is intended to form the inside in the finished package.

The cross-section of the packing laminate shown in FIG. 1 presents a central thicker layer 2 of polystyrene foamed plastic with small closed cells. The thickness of this layer 2 may be 0.5–2 mm, preferably about 1 mm, and the density of the material is 0.5–0.15 g/cm³. The layer 1 of the packing laminate which is intended to constitute the inside of the packages manufactured from the packing laminate, consists of a layer of so-called high-impact polystyrene, that is to say a mixture of styrene and butadiene and the material shall have a modulus of elasticity between 14,000 and 20,000. The layer 1 shall have a pick up weight of 50–100 g/m², preferably approx. 70 g/m², and the rupture elongation shall be between 10 and 100 percent.

The layer 3 which is intended to constitute the outside of the packages manufactured from the packing laminate, consists of a preferably crystalline polystyrene layer or a polystyrene layer with some addition of butadiene. The pick up weight shall be 30–80 g/m², and preferably approx. 50 g/m². The modulus of elasticity of the material making up the layer 3 shall be between 30,000 and 50,000 and the rupture elongation 2–10 percent.

The packing laminate is preferably manufactured so that the foamed plastic layer 2 is extruded in a known manner and that subsequently the coating layers 1 and 3 are applied by means of extrusion process to the side surfaces of the foamed plastic layer 2 in such a manner that a good adhesion is obtained between the outside layers 1 and 3 and the foamed plastic layer 2.

The stress-strain curves represented in FIG. 2 relate to the outer layers 1 and 3 shown in FIG. 1, and for the sake of simplicity the curves have been designated with the same reference numerals, that is to say 1 and 3 respectively.

For greater clarity we will define in the following the modulus of elasticity as a function of the differential quotient of the curves 1 and 3 respectively, whilst the values given above for the moduli of elasticity of the materials refer to the moduli of elasiticity within the limits of proportionality, that is to say the first straight pieces of the curves, where the stress and the strain of the material are in a mainly linear relationship with one another.

As can be seen from FIG. 2 curve 1, which relates to the coating layer 1 of the laminate, the material has a modulus of elasticity at the start (that is to say the modulus of elasticity with the range of proportionality) which is smaller than the corresponding modulus of elasticity of the coating layer 3. When a stress is reached which is FIG. 2 is designated by A, a linear relationship between stress and strain no longer exists, but it is said popularly that the material commences to yield, that is to say it stretches relatively more also at relatively small increases in stress. When the stress on the material layer 1 has risen to the level B the slope of the curve is very small, that is to say the value of the modulus of elasticity at this point has dropped to a value which may be as low as between 200 and 600 kg/cm². These values of the moduli of elasticity are proportional to the angles $\alpha$ and $\beta$ respectively indicated in the figure, which designate the angle of the tangent against the horizontal plane in a certain point. A further increase in stress on the material layer 1 results in rupture, whilst the material has then reached an elongation of approx. 100 percent, that is to say the material can be described as relatively tough, even though it is within the first stress range up to the yield limit A relatively rigid and shows moderate tendency towards stretching.

The material layer 3, as can be seen from FIG. 2, has a higher modulus of elasticity, which implies that the material is stretched less at increased stresses, but this material layer reaches quite quickly its rupture load without the elongation rising to more than 2–10 percent, which implies that the material is relatively brittle and does not have the capacity to stretch at increased stress but retains its rigidity right to the point when rupture takes place.

When the packing laminate in accordance with FIG. 1 is used in a package, the latter exhibits exceptionally good rigidity properties, since both the outer layer 3 and the inner layer 1 are relatively rigid, and this is combined with a relatively broad central layer 2 which imparts a beam effect to the laminate, that is to say a large moment of inertia which lends it great rigidity. When the material, in connection with transport and handling is subjected to impact and shocks, the stresses on the outer layers 1 and 3 will increase momentarily and as long as the said stresses keep below the limit marked A nothing special will happen to the material. Should the stresses be so great however that they exceed the limit A and approach the limit B, the material layer 1 will commence to "yield," that is to say the modulus of elasticity for the load condition that has arisen diminishes and the material becomes tough and stretches. The risk of breakage on the inside layer 1 is therefore small, since the material has a very high stretch capacity, whilst the packing laminate naturally loses a little of its rigidity as long as the stress lasts, since the modulus of elasticity of the layer 1 is momentarily reduced. As soon as the stress has disappeared however the material laminate will regain its rigidity, since the modulus of elasticity for the layer 1 reaches again its normal value when the stress has fallen below the limit of proportionality, which is marked with A.

In cases where the packing laminate is to be used for the packing of filling materials which include a gas, or shalll be protected against for example the effect of air, it is suitable to provide a further plastic layer of for example polyvinyl chloride, polyamid (Nylon), polyvinylidene chloride (Saran) or nitrile rubber modified acrylonitrile-methyl acrylate copolymer (Barex), which plastic material is suitably placed between the inner homogeneous plastic layer and the foamed plastic layer.

By using a packing laminate in accordance with the invention it is thus possible to manufacture very rigid packages which moreover do not absorb liquid and which have the property that the inside layer does not crack in spite of large momentarily increases in stress.

I claim:

1. A laminated package forming material comprising a layer of foamed polystyrene having a fine cellular structure, a density of 0.05 to 0.15 g/cm³ and a thickness of from 0.5 to 2 mm., a first homogeneous layer of a mixture of polystyrene and butadiene adhered to that side of said foamed layer for constituting the inside of the package, said first layer having a modulus of elasticity of from 14,000 to 20,000, a pick-up weight of from 50 to 100 g/m² and a rupture elongation limit of between 10 and 100 percent and a second homogeneous layer essentially entirely of polystyrene adhered to the other side of said foamed layer for constituting the outside of the package, said second layer having a modulus of elasticity of from 30,000 to 50,000, a pick-up weight of from 30 to 80 g/m² and a rupture elongation limit of between 2 and 10 percent.

2. A laminated structure as claimed in claim 1 and further comprising at least one substantially gas impervious layer disposed between said foamed layer and at least one of said first and second layers, said substantially gas impervious layer comprising a material selected from the group consisting of polyamides, polyvinylidene chloride and nitrile rubber modified acrylonitrile-methyl acrylate copolymer.

* * * * *